United States Patent [19]
Seal et al.

[11] 3,767,151
[45] Oct. 23, 1973

[54] ELECTRIC WIRING BOX POSITIONER

[76] Inventors: Glendon E. Seal, 4554 E. 14th St., Tucson, Ariz. 85711; Willis R. Arford, 8810 E. Shenandoah Pl., Tucson, Ariz. 85710

[22] Filed: Nov. 12, 1971

[21] Appl. No.: 198,350

[52] U.S. Cl............ 248/205 R, 174/58, 248/DIG. 6
[51] Int. Cl............................................... H02g 3/12
[58] Field of Search...................... 248/205, DIG. 6, 248/300, 27; 220/3.3, 3.8, 3.9; 174/53, 58, 63

[56] References Cited
UNITED STATES PATENTS

| | | | |
|---|---|---|---|
| 1,288,024 | 12/1918 | Kendig............................ | 248/DIG. 6 |
| 2,736,450 | 2/1956 | Atkinson........................ | 248/DIG. 6 |
| 3,588,019 | 6/1971 | Cozeck ........................ | 248/205 R X |
| 3,376,005 | 4/1968 | Swanquist....................... | 220/3.9 X |
| 3,606,223 | 9/1971 | Havener........................... | 220/3.9 X |
| 2,316,389 | 4/1943 | Atkinson........................ | 248/DIG. 6 |
| 2,531,840 | 11/1950 | Carlson............................ | 248/205 R |
| 1,453,017 | 4/1923 | Lindelof........................... | 248/205 R |
| 2,473,051 | 6/1949 | Carlson............................ | 248/205 R |
| 1,855,751 | 4/1932 | Buchanan ....................... | 248/205 R |
| 1,917,450 | 7/1933 | Lademann ...................... | 248/205 R |

*Primary Examiner*—Roy D. Frazier
*Assistant Examiner*—Rodney H. Bonck
*Attorney*—Raymond E. Fidler et al.

[57] ABSTRACT

An electric wiring box positioner for use with metal studs attaches to the side of the box remote from a stud or other structural support member to which the box is attached and includes planar surface portions lying parallel with the vertical faces of the stud for abutting engagement with the inner faces of the wall sheets attached to the stud.

4 Claims, 3 Drawing Figures

Patented Oct. 23, 1973

3,767,151

ELECTRIC WIRING BOX POSITIONER

The present invention relates in general to a method and apparatus for mounting an electric outlet or junction box in a wall, and it relates more particularly to a new and improved method and apparatus for mounting an electric outlet box in a hollow wall of the type utilizing channel shaped metal studs.

BACKGROUND OF THE INVENTION

While the substitution of metal studs for wood studs has facilitated the building of walls by eliminating the need for cross braces, toe-nailing and the like, it has created new problems for the electrician. The rigid supports for the outlet boxes, i.e., the previously used solid studs and cross pieces have been eliminated, and replaced with relatively flexible, sheet metal studs. Nevertheless, it is important that the outlet boxes be firmly and rigidly supported in the wall to prevent cracking of the dry wall or plaster in the vicinity of the box and to ensure that the box remains in place after the wall is completed.

OBJECTS OF THE INVENTION

Therefore, a principal object of the present invention is to provide a new and improved method of mounting electric outlet and junction boxes.

Another object of this invention is to provide a new and improved mounting structure for an electric outlet or junction box.

A further object of this invention is to provide a new and improved bracket for mounting electric outlet boxes in hollow walls.

SUMMARY OF THE INVENTION

Briefly, the above and further objects may be realized in accordance with the present invention by attaching one side of the box to a vertical stud and attaching to the opposite side of the box a bracket having end flanges lying coplanar with the opposite faces of the stud for engagement with the inner surfaces of the dry wall or lathing mounted over the stud. In one embodiment of the invention, the bracket is separate from and fits onto the box beneath the associated plaster ring, and in another embodiment the bracket is permanently fastened to the box to form an integral part thereof.

BRIEF DESCRIPTION OF THE DRAWING

The above and further objects and a better understanding of the invention may be had from the following detailed description taken in connection with the accompanying drawing, wherein.

Figure 1:
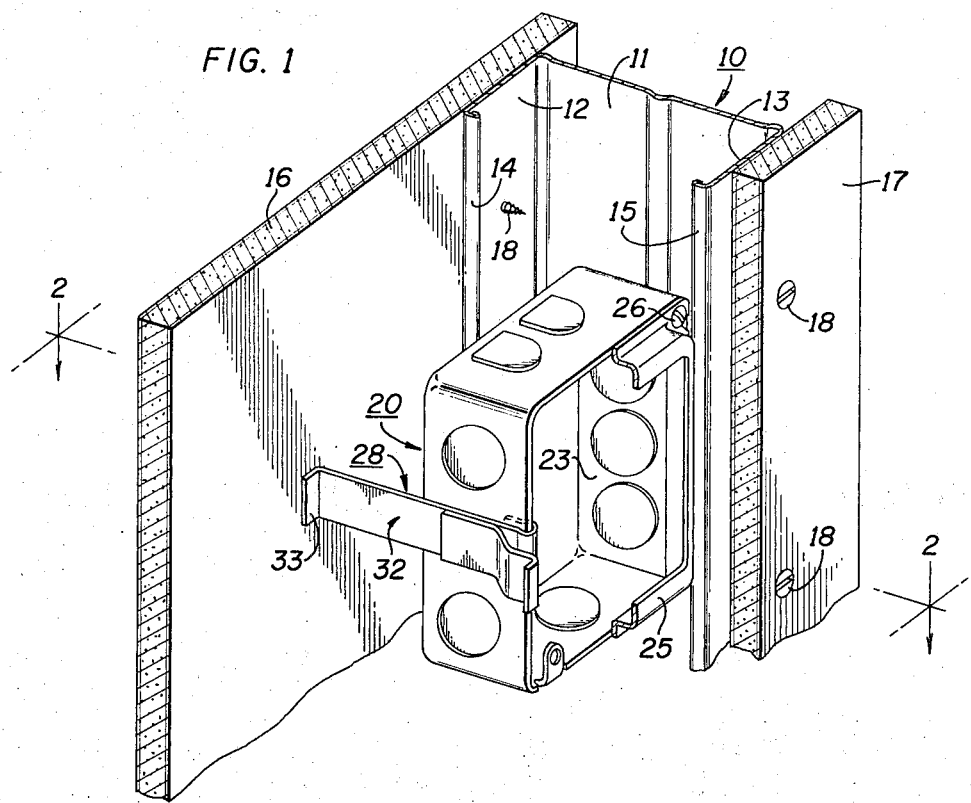
FIG. 1 is a cut-away perspective view of a portion of a wall in which the present invention is utilized to mount an electric outlet box.
Figure 2:
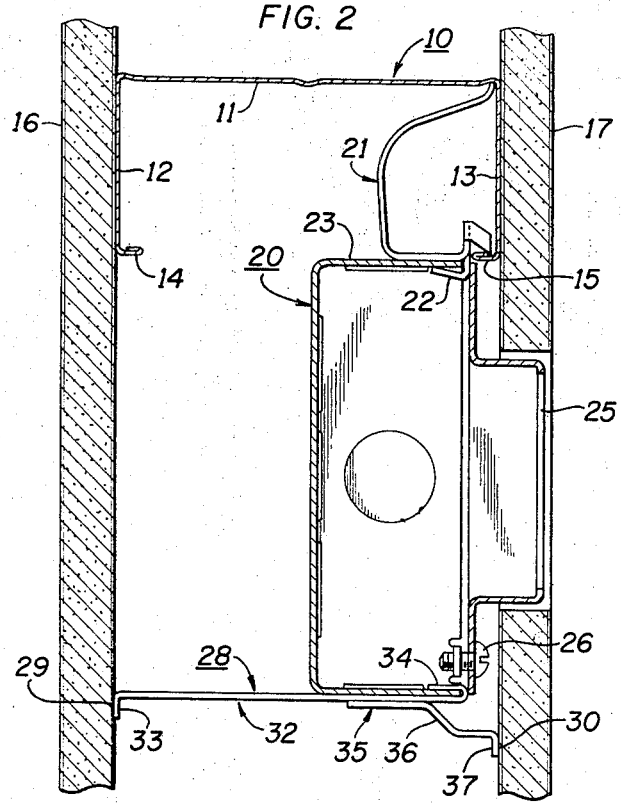
FIG. 2 is a sectional view taken along the line 2—2 of FIG. 1.

Referring now to the drawing and particularly to FIGS. 1 and 2, a conventional hollow wall comprises a vertical stud 10 having a web 11, sidewalls 12 and 13 and re-entrant flanges or lips 14 and 15 provided at the edges of the sidewalls 12 and 13. A pair of sheet members 16 and 17 are secured respectively to sides of the stud 10 by means of a plurality of sheet metal type screws 18. The sheet members may be conventional dry wall sheets or lathe sheets over which plaster is laid. In either case, the sheet members 16 and 17 are structural members. As shown, the sheets 16 and 17 lie directly against the sidewalls 12 and 13 of the stud whereby the inner surfaces of the sheets are coplanar with the outer surfaces of the sidewalls 12 and 13 of the stud.

In order to mount an electric outlet box 20 within the wall, the common practice has been to secure it to a stud or to a cross brace connected between adjacent studs. However, this does not provide a sufficiently rigid mount when metal studs are employed because of the flexibility of the stud. In the illustrated embodiment of the invention, the outlet box 20 is mounted to the stud 10 by means of a spring clip 21 compressed between the web 11 and the lip 15 of the stud. The box 20 is secured to the clip 21 by means of a resilient tab 22 which is snapped over the forward edge of the adjacent wall 23 of the box. A conventional plaster ring 25 is fastened by a plurality of screws 26 to the box 20 over the projection 22 to secure the clip 21 to the box 20. In the case of a junction box a cover plate is mounted over the front open end of the box in the same manner.

The clip and stud thus provide a cantilever support for the outlet box 20 which, due to the inherent flexibility of the clip and the stud permits some pivotal movement of the outlet box about the upper forward edge of the box 20 as shown in FIG. 2. In order to prevent such movement of the box 20, there is provided in accordance with the present invention a bracket member 28 which is secured to or forms a part of the box 20 and includes opposite end surfaces 29 and 30 which are coplanar with the outer surfaces of the stud walls 12 and 13. The box 20 including the bracket 28 is mounted to the stud before the wall sheets 16 and 17 are assembled so that after the wall sheets 16 and 17 have been installed, the bracket 28 prevents movement of the edge of the box 20 remote from the stud 10 thereby ensuring a fixed and securely mounted box.

Referring to FIG. 2, it may be seen that the bracket 28 is separable from the box 20 and is designed to be attached to the box in the field by the electrician. Accordingly, the bracket has a body member 32 having at one end a perpendicular flange 33 on which the surface 29 is provided. At the other end, the member 32 is bent back on itself to provide an open hook 34 which may be slipped over the edge of the box. If desired, a pair of pliers may then be used to squeeze the hook against the sidewall of the box to secure it in place. Attached to the body member 32 as by welding is a leg member 35 having an offset portion 36 terminating in a flange 37 for providing the wall engaging surface 30. The purpose of the offset 36 is to facilitate attachment of the plaster ring to the box 20 after the box is mounted and the bracket 28 has been attached. It may be seen that the plaster ring overlies the hook 34 to hold the bracket in place on the box in the final installation.

Figure 3:
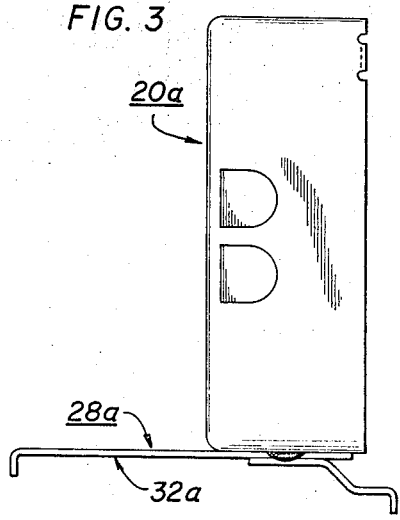
FIG. 3 is a side view of another embodiment of the present invention.

Referring to FIG. 3, there is shown another embodiment of the present invention wherein a similar bracket 28a is permanently attached to an outlet box 20a to form an integral part thereof. The bracket 28a thus has a body portion 32a which is bonded, as by welding, to the box 20a, whereby the hooked end is unnecessary. In other respects, the bracket 28a is the same as the bracket 28 described hereinbefore. Where the outlet or junction box is plastic, the bracket of the present invention may be molded as an integral part of the box.

Since different size studs are used for different types of walls as well as in different geographical areas, the brackets may be provided in different lengths corresponding with the widths of the studs being used. The brackets may, however, have a standard width of one-half inch with end flanges 33 and 37 one-quarter inch long. Such dimensions provide end surfaces 29 and 30 which are sufficiently large so as not to puncture conventional wall sheeting.

While the present invention has been described in connection with particular embodiments thereof, it will be understood that those skilled in the art may make many changes and modifications without departing from the true spirit and scope thereof. Accordingly, the appended claims are intended to cover all such changes and modifications as fall within the true spirit and scope of the present invention.

What is claimed is:

1. A mounting for supporting an electric outlet or junction box within a hollow wall formed by a plurality of vertical studs over which wall sheets are fastened in spaced apart parallel, facing relationship, said box being of the type having a bottom rear wall, sidewalls and an open front face over which a cover plate or plaster ring may be removably secured, said mounting comprising means mounting one sidewall of said box to one of said studs, an elongated bracket connected to another sidewall of said box intermediate the ends of said bracket, said bracket extending in a direction perpendicular to said bottom wall and having flat end surfaces respectively disposed rearwardly and forwardly of the rear and front edges of said sidewalls for abutting the inner faces of said wall sheets for holding said box in a fixed position intermediate said walls.

2. A mounting according to claim 1 wherein said bracket comprises end portions offturned at ninety-degrees to the elongated body portion of said bracket and on which said flat surfaces are provided.

3. A mounting according to claim 2 wherein said bracket includes a hook fitting over the front edge of said other sidewall of said box and over which said cover plate or plaster ring is adapted to be secured to said box.

4. A mounting according to claim 2 wherein said bracket is connected to said other sidewall of said box by means of a weldment fixedly securing said bracket to said other sidewall.

* * * * *